Nov. 8, 1960  A. LE BOUTILLIER ET AL  2,959,267
TRANSFER MACHINES
Filed Jan. 13, 1958  5 Sheets-Sheet 1

INVENTORS
Arthur Le Boutillier
Michael Charles Stevens
BY
Ralph B. Stewart
ATTORNEY Nov. 8, 1960 A. LE BOUTILLIER ET AL 2,959,267
TRANSFER MACHINES
Filed Jan. 13, 1958 5 Sheets-Sheet 2

INVENTORS
Arthur Le Boutillier
Michael Charles Stevens
BY
Ralph B. Stewart
ATTORNEY

Fig. 3.

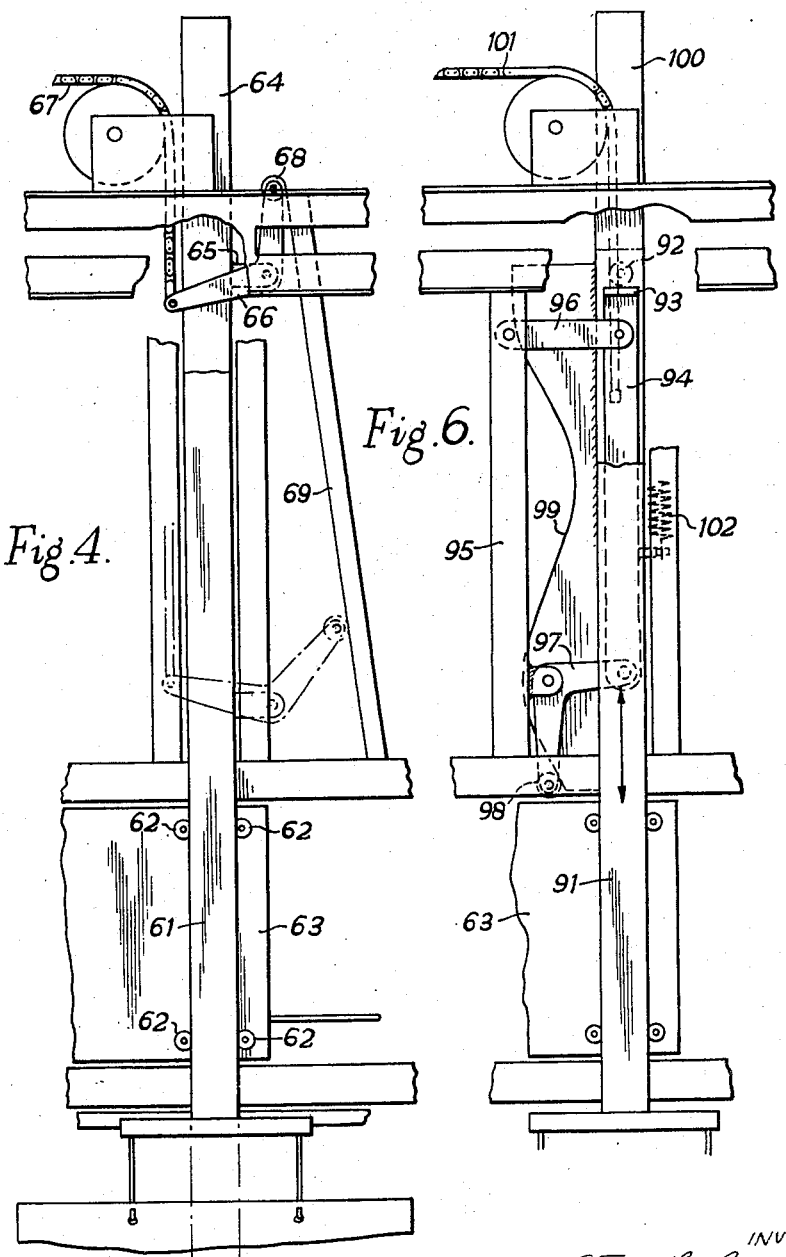

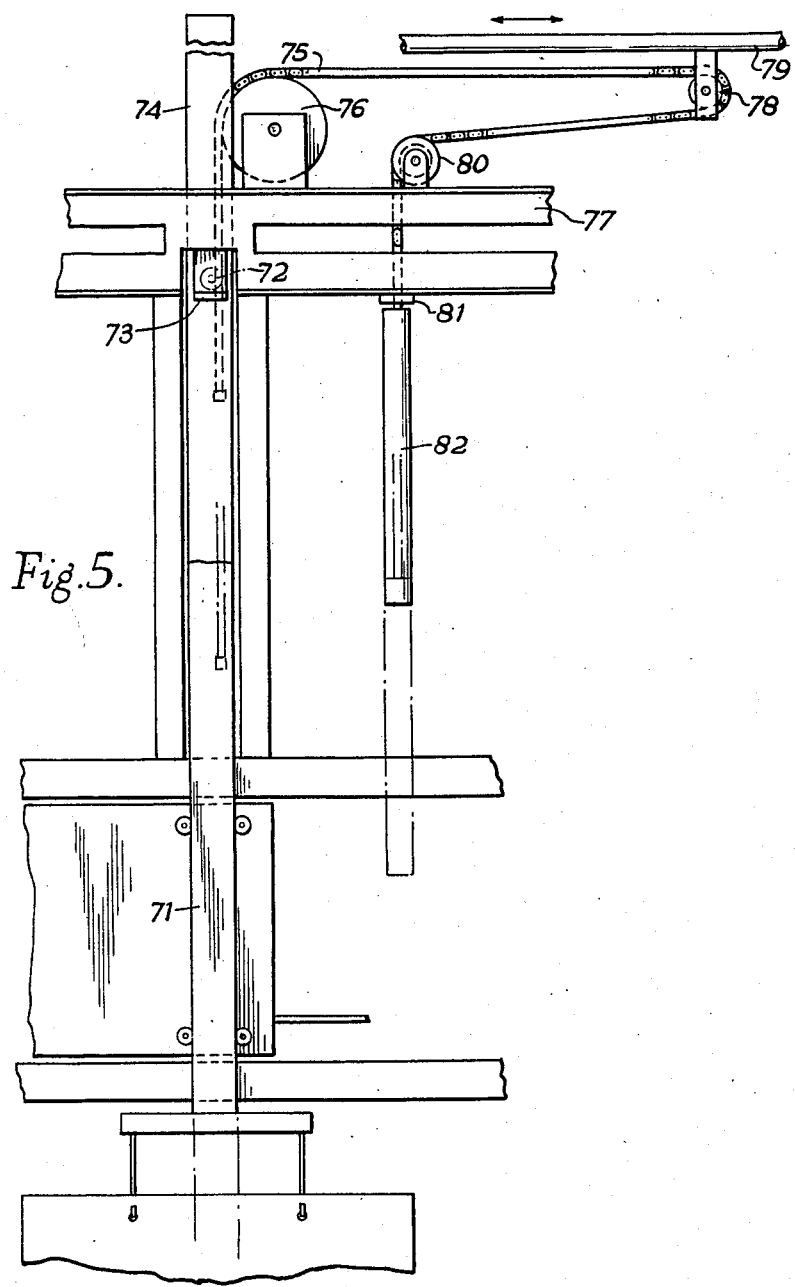

United States Patent Office 2,959,267
Patented Nov. 8, 1960

2,959,267
TRANSFER MACHINES

Arthur Le Boutillier and Michael Charles Stevens, London, England, assignors to A. C. Cossor Limited, London, England, a British company Filed Jan. 13, 1958, Ser. No. 708,704

Claims priority, application Great Britain Jan. 14, 1957

4 Claims. (Cl. 198—19)

The present invention relates to transfer machines, that is, machines adapted to perform automatically a plurality of manufacturing operations upon a workpiece at a plurality of stations respectively on the machine, and to move the workpiece from station to station.

It is sometimes desirable when carrying out certain manufacturing operations on a workpiece that the workpiece should be brought into the positions at which such operations are performed by movement in a generally vertical direction. An example of such an operation is the treatment of a workpiece by immersion in a liquid contained in a tank or box.

An object of the present invention is to provide a transfer machine, in at least one station of which a workpiece can be moved vertically to a position as which a manufacturing operation is performed on it.

According to the present invention there is provided a transfer machine comprising a workpiece carrier supported by a rail and adapted to be moved generally horizontally along the rail from station to station, at least one of the stations comprising a vertically movable auxiliary carrier and the rail at the station being provided with a gap, the auxiliary carrier having supporting means for bridging the gap so permitting the workpiece carrier to be moved into the station, the workpiece carrier being then supported by the said supporting means, and actuating mechanism being provided for moving the auxiliary carrier in the vertical direction when a workpiece carrier has been moved into the station, whereby the workpiece carrier and hence a workpiece carried by the workpiece carrier can be moved vertically to a position at which a manufacturing operation is performed on the workpiece.

The workpiece carrier may be moved along the rail from station to station by means of a trolley on which are provided guiding means in which the workpiece is so mounted as to be movable in a vertical direction, means being provided for moving the trolley in a generally horizontal direction.

The actuating mechanism for moving the auxiliary carrier in a vertical direction may comprise a substantially non-extensible flexible connection, for example a chain, connected at one end to a connecting member provided on the auxiliary carrier and passing over a vertical wheel mounted on a fixed portion of the transfer machine, the flexible connection being operatively connected towards its other end with a generally horizontal track-rod, means being provided for moving the track-rod longitudinally in both senses.

Alternatively the actuating mechanism may comprise a cam member adapted to be moved in a vertical direction and provided with a cam surface on which rides a cam follower provided on one end of a bell-crank which is mounted on a fixed portion of the transfer machine, the other end of the bell-crank being pivotally connected to the auxiliary carrier, whereby vertical movement of the cam member causes vertical displacement of the auxiliary carrier against the loading action of a spring. The vertical movement of the cam member may be derived from the lognitudinal movement of a generally horizontal track rod.

The stations in a transfer machine, according to the invention, having more than one station in which a workpiece can be moved vertically, may be provided with the same or different forms of actuating mechanism.

A number of advantages accrue from the use of a transfer machine according to the invention. One advantage lies in the possibility of the reduction of the size of such transfer machines compared with machines in which a workpiece is brought by a movement with a substantial horizontal component into a position where a manufacturing operation is to be performed. The vertical movement employed at a station of a transfer machine according to the invention allows such stations to be placed more closely together with consequent saving of floorspace and of the materials used in the construction of the machine. A further economy is to be found in the application of a transfer machine according to the invention to a manufacturing operation involving the immersion of a workpiece in a liquid contained in a box or tank. When a workpiece is moved vertically into the tank of liquid, the tank may be constructed with vertical sides which may lie close to the workpiece on all sides. This leads not only to simplification of, and economy of materials used in, the construction of the tank, but also reduces to a minimum the volume of liquid necessary and the area of the exposed surface of the liquid. This is of particular interest when volatile or expensive liquids are being used.

The invention will now be described, by way of example, with reference to the accompanying drawings, wherein:

Fig. 3 is a diagrammatic plan view of an embodiment of the invention showing four stations, Fig. 4 is a fragmentary side elevation of a further embodiment of the invention, showing one station, Fig. 5 is a fragmentary side elevation of another embodiment of the invention, showing one station, Fig. 6 is a fragmentary side elevation of yet another embodiment of the invention, showing one station.

Figure 1:
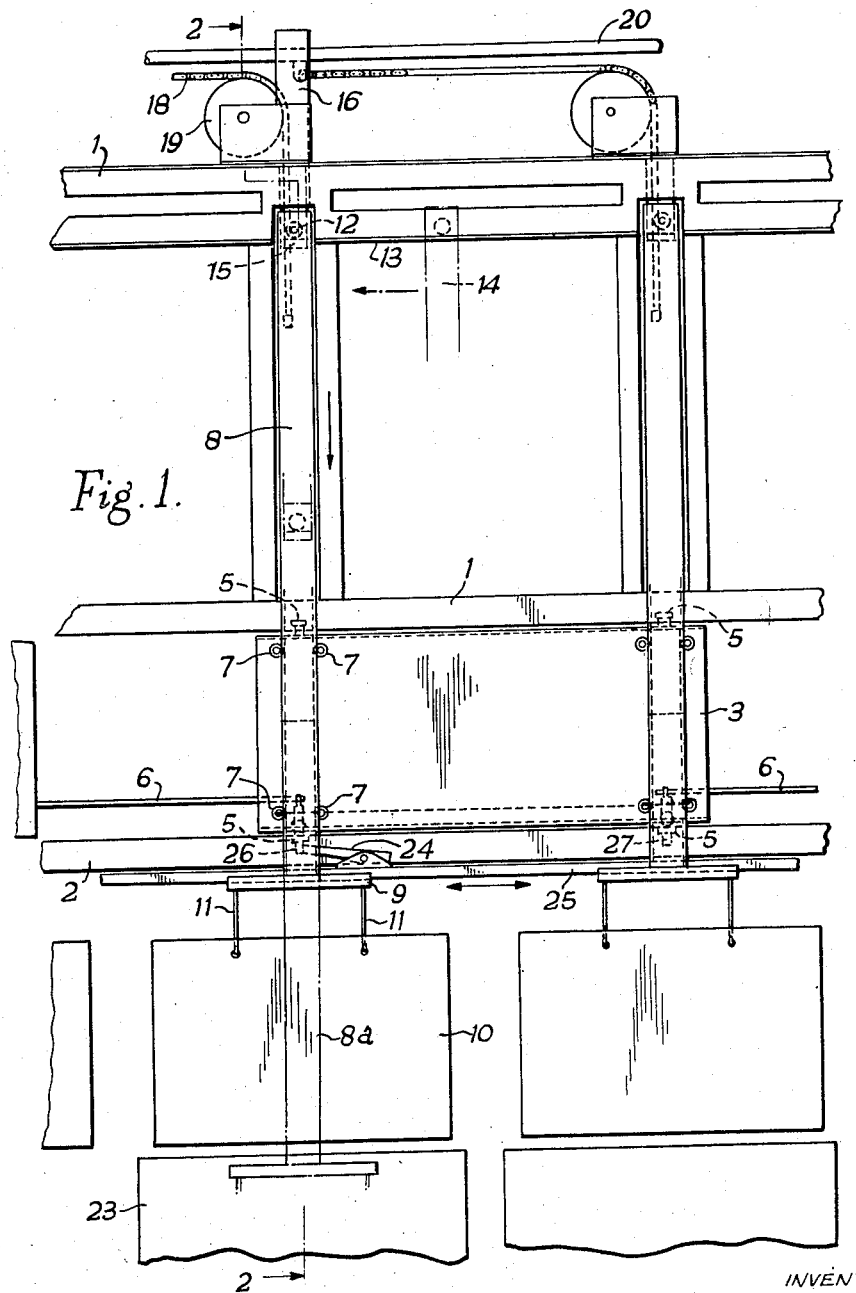
Fig. 1 is a fragmentary side elevation of one embodiment of the invention, showing two stations.
Figure 2:
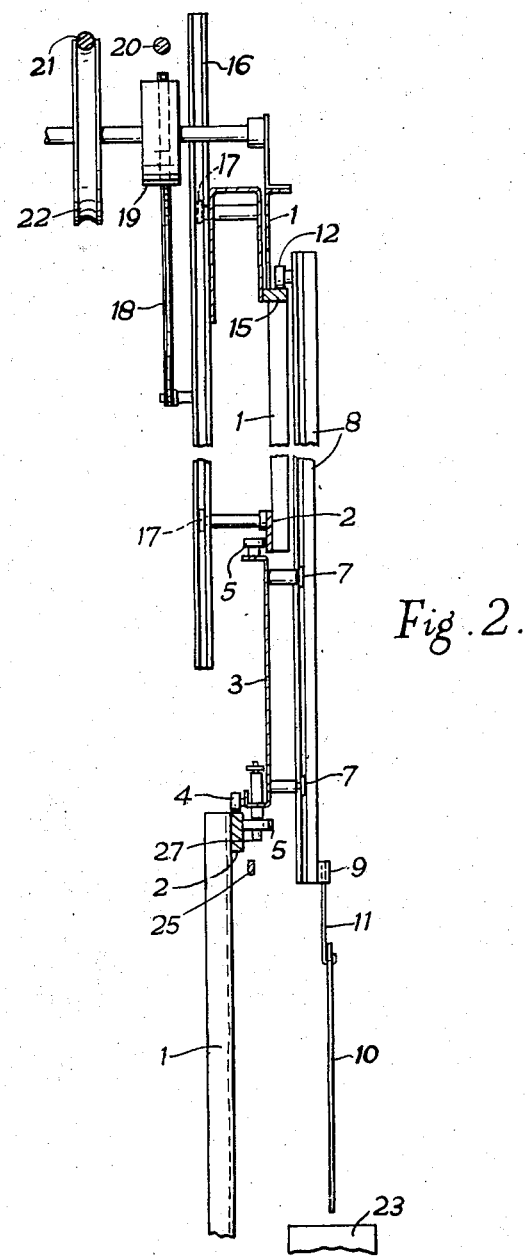
Fig. 2 is a vertical cross-section of Fig. 1 along the line 2—2.

Referring to Figs. 1 and 2, a frame 1 of a transfer machine is provided with rails 2 on which runs a trolley 3 provided with supporting rollers 4 and guiding rollers 5. The trolley is connected to adjacent trolleys by means of link bars 6 which are pivotally connected to the trolleys. Mounted at one end of the trolley 3 are two pairs of guide rollers 7 which engage grooves provided in the sides of a workpiece carrier 8 mounted to be movable in a vertical direction between the guide rollers. From a cross-bar 9, mounted at the lower extremity of the workpiece carrier 8, is suspended a workpiece 10 by means of hooks 11. A roller 12 is provided at the upper extremity of the workpiece carrier 8 and runs on a rail 13 provided on the frame 1 of the transfer machine when the workpiece carrier is being moved from station to station. At the station there is a gap 13a in the rail 13. A position occupied by a workpiece carrier during the movement from station to station is shown in chain-dotted lines at 14, the direction of movement being indicated by the chain-dotted arrow. When the workpiece carrier is in a station, the roller 12 is supported by a supporting bracket 15 mounted on an auxiliary carrier 16 and which can bridge the gap 13a in the rail 13. The auxiliary carrier 16 is movable in a vertical direction between guide rollers 17 which are mounted on the frame 1 of the transfer machine and engage grooves provided in the sides of the auxiliary carrier 16. The auxiliary carrier 16 is supported by a chain 18, one end of which is attached to the auxiliary carrier, and which passes over a wheel 19 mounted on the frame, the other end being connected to a horizontal track rod 20 which is supported by rollers. A second track rod 21 is shown in Fig. 2, supported by a grooved roller 22. If, when the workpiece carrier 8 is in the station, and is supported by the bracket 15, the track rod 20 is moved from left to right, the auxiliary carrier 16 will be lowered and with it the bracket 15 and the workpiece carrier 8. The workpiece carrier is lowered until it occupies the position 8a shown in chain-dotted lines, when the workpiece 10 will be in a position inside a tank 23 at which an operation is performed on the workpiece. Movement of the workpiece carrier from station to station is achieved by movement of the trolley 3 along the rails 2 by means of a pawl 24 mounted on a lower track rod 25 which may be moved in both senses as indicated by the double-headed arrow. When the lower track rod 25 moves from right to left the pawl engages with a projection 26 provided on the trolley 3, thereby moving the trolley from right to left. After a workpiece carrier has been moved from one station to the next the direction of motion of the lower track rod 25 is reversed until the pawl has moved beyond a succeeding projection 27 provided for the next movement. In this embodiment, one trolley moves two workpiece carriers, which occupy successive stations of the machine, the mechanism at one end of the trolley comprising workpiece carrier, auxiliary carrier and sprocket chain and wheel, as already described, being duplicated at the other end of the trolley.

Figure 3:
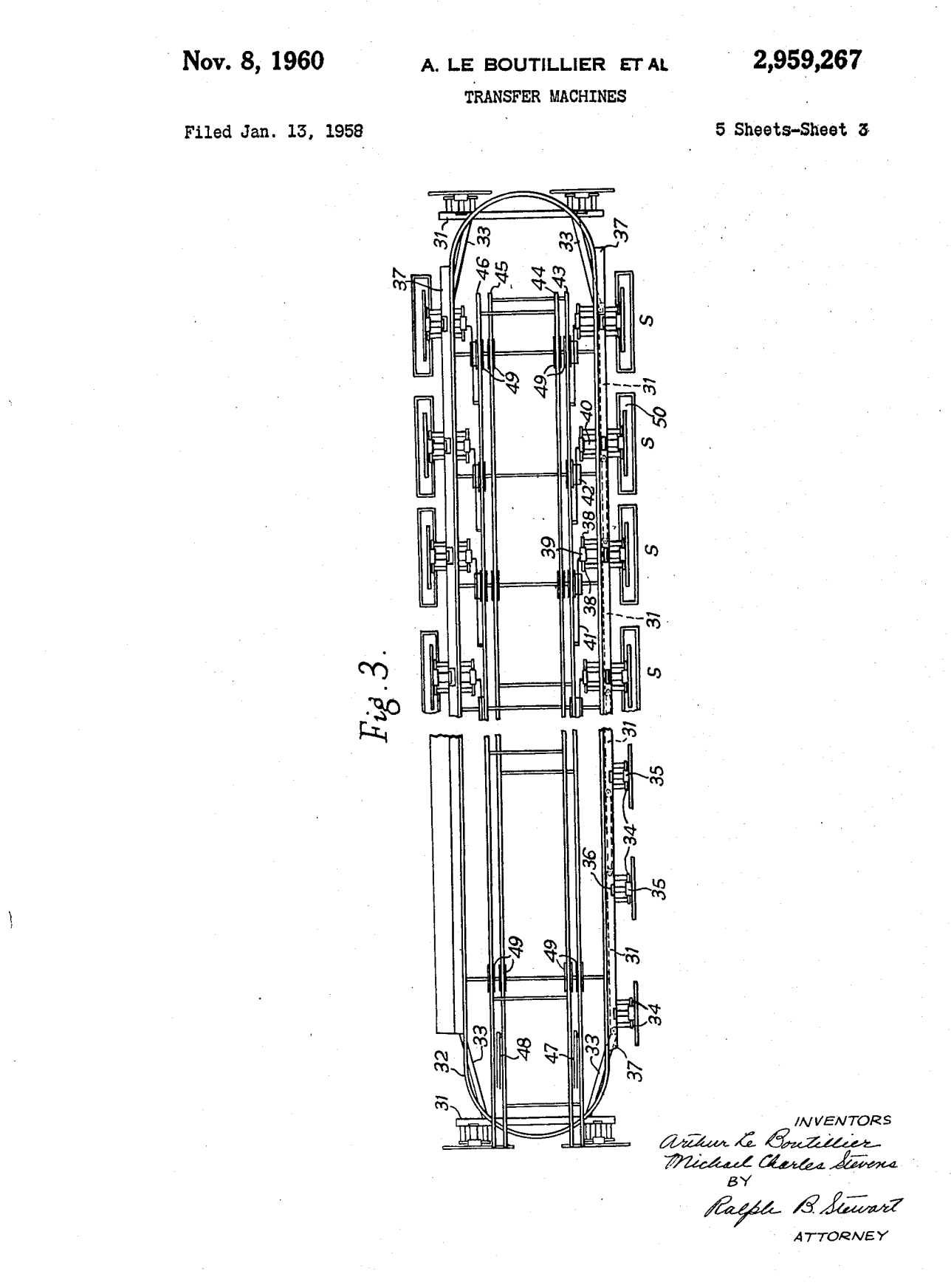

In the plan view of a transfer machine according to the invention shown in Fig. 3, a number of trolleys 31, some of which are indicated by broken lines, are mounted on endless rails provided on the frame 32 of the machine so that they may move round the machine, the trolleys being linked by link bars 33, only four of which are shown. Each trolley has a set of guide rollers 34 provided at each end of the trolley, and a workpiece carrier 35 is slidably mounted in each set of guide rollers and is supported by means of a roller 36 provided at its upper extremity which can move along a rail 37 which is divided into two parts. As movement of the trolleys round the end of a machine as shown in Fig. 3 is incompatible with the continued support of the workpiece carriers by a continuation of the rail 37 round the end of the machine, the two parts of the rail are inclined downwards at their ends to points close to the top of the trolleys, and the rollers provided at the upper ends of the workpiece carriers rest on the tops of the trolleys while the trolleys and workpiece carriers are moving round the ends of the machine. At each of the four stations S shown is provided a set of guide rollers 38 mounted on the frame of the machine and in which moves an auxiliary carrier 39. The auxiliary carrier is provided with a bracket 40 which can bridge a gap provided in the rail 37 at each station. The auxiliary carrier can be moved in a vertical direction by means of a chain 41 which passes over a wheel 42, one end of the chain being attached to the auxiliary carrier and the other end being attached to a horizontal track rod 43. Four track rods are provided on the machine, and are linked in pairs, 43 and 46 and 44 and 45. The pair 43 and 46 is given an intermediate reciprocating motion by means of the connecting rod 47 and the other pair a similar or different reciprocating motion as convenient by the connecting rod 48. These reciprocating motions are thereby made available at any point along either side of the machine. The track rods are supported by rollers 49. When a workpiece carrier is at a station it can be lowered by a movement of the track rod 43 from left to right in the figure until a workpiece attached to the workpiece carrier is in a position in the container 50 at which an operation is performed on the workpiece.

In the embodiment shown in Fig. 4 a workpiece carrier 61 is slidably mounted between guide rollers 62 provided on a trolley 63, and, when in the station, the workpiece carrier is supported by means of a roller and a bracket, not shown in Fig. 4 but substantially as described with reference to Figs. 1 and 2, by an auxiliary carrier 64. On a fixed projection 65 provided on the auxiliary carrier 64 is pivotally mounted a bell-crank 66, to one end of which is attached a chain 67 while the other end carries a cam follower 68 which can move along the inclined surface 69. When the auxiliary carrier 64 is lowered by movement of the chain 67, the vertical distance through which the auxiliary carrier moves will be greater than the corresponding movement of the chain. The lowered position of the chain, bell-crank, and workpiece carrier is shown in broken lines.

Referring now to Fig. 5, a workpiece carrier 71 is supported by means of a roller 72 provided at its upper end resting on a bracket 73 provided on an auxiliary carrier 74. A chain 75 attached by one end to the auxiliary carrier passes over a wheel 76 mounted on the frame 77 of the machine, round a wheel 78 mounted on a track rod 79, over a second wheel 80 mounted on the frame 77, through an eye 81 mounted on the frame, and is attached by its other end to a weight 82. When the track rod is moved from right to left, the auxiliary carrier 71 is lowered at twice the speed of the movement of the track rod 79. If the auxiliary carrier reaches the bottom of its permitted movement before the completion of the right-to-left movement of the track rod the weight 82 will then descend also, its lowered position being shown in chain-dotted lines. When the track rod 79 then moves from left to right, the auxiliary carrier will not be lifted until the weight has ascended as far as the eye 81. This arrangement increases the proportion of the time for the whole cycle which a workpiece attached to the workpiece carrier spends in the lower position in which a manufacturing operation is performed.

In the embodiment shown in Fig. 6, a workpiece carrier 91 is supported by means of a roller 92 provided at its upper end resting on a bracket 93 at the upper extremity of an auxiliary carrier 94. The auxiliary carrier 94 is mounted on a vertical member 95 of the frame of the machine by means of a pivotally connected link 96 and a bell-crank 97. The free end of the bell-crank carries a cam follower 98 which rides on a cam surface 99 provided on a cam member 100. The cam member is supported by means of a chain 101. A loading spring 102 is provided which gives the auxiliary carrier 94 an upward bias. Lowering of the cam member 100 by means of the chain 101 causes rotation of the bell-crank 97 and hence lowering of the auxiliary carrier 94 and workpiece carrier 91. The movement of the workpiece carrier in the arrangement shown in Fig. 6 is less than the corresponding movement of the chain.

In a transfer machine, according to the invention, having a number of stations in which a workpiece can be moved vertically, arrangements such as those shown in Figs. 4, 5 and 6 are of value in obtaining a variety of forms of movement of workpieces at different stations without increasing the number of track rods or similar actuating devices.

We claim:

1. A transfer machine comprising a rail, a workpiece carrier supported by said rail and adapted to be moved generally horizontally along the rail from station to station, the rail having a gap therein at a station, at least one vertically movable auxiliary carrier located at each station, supporting rail means mounted on said auxiliary carrier and adapted to bridge the gap in said rail and support said workpiece carrier when the carrier is moved into the station, linearly reciprocable actuating means common to and extending between said plurality of stations, means connecting the actuating means to said auxiliary carriers, and drive means for moving the actuating means in both directions, whereby a movement of the actuating means causes a corresponding vertical movement of the workpiece carrier, said connecting means comprising a substantially non-extensible flexible connection, a bell-crank pivotally connected about a horizontal axis at the apex of its angle to said auxiliary carrier, a fixed cam member having a linear cam surface inclined to the vertical, and a cam follower mounted on a first arm of said bell-crank and riding on said cam surface and moveable therealong the flexible connection being attached at one of its ends to said actuating means and at its other end to the second arm of said bell-crank.

2. A transfer machine as claimed in claim 1 wherein said actuating means is a generally horizontal, longitudinally movable track-rod and said connecting means further comprises a vertical wheel rotatably mounted on a fixed portion of said machine, said flexible connection passing over said wheel and being attached to said track rod and said second arm of the bell-crank.

3. A transfer machine comprising a rail, a workpiece carrier supported by said rail and adapted to be moved generally horizontally along the rail from station to station, the rail having a gap therein at a station, at least one vertically movable auxiliary carrier located at each station, supporting rail means mounted on said auxiliary carrier and adapted to bridge the gap in said rail and support said workpiece carrier when the carrier is moved into the station, linearly reciprocable actuating means common to and extending between said plurality of stations, said actuating means being a generally horizontal track-rod longitudinally movable in both directions, means connecting the actuating means to said auxiliary carriers, and drive means for moving the actuating means in both directions, whereby a movement of the actuating means causes a corresponding vertical movement of the workpiece carrier, a trolley movable in a generally horizontal direction, guiding means on said trolley for moving the workpiece carriers horizontally and guiding it for relative vertical movement and drive means for moving said trolley from station to station, said connecting means comprising a substantially non-extensible flexible connection, a vertical wheel rotatably mounted on a fixed portion of said transfer machine, a vertical second wheel mounted on a fixed portion of the machine, a vertical third wheel mounted on said track rod, an eye fixed to said machine and a weight attached to one end of said flexible connection and having dimensions such that it cannot pass through said eye and a mass less than the combined mass of said auxiliary and said workpiece carriers, the second end of said flexible connection passing through said eye, over said second wheel, round said third wheel, over said vertical wheel and being attached to said auxiliary carrier.

4. A transfer machine comprising a rail, a workpiece carrier supported by said rail and adapted to be moved generally horizontally along the rail from station to station, the rail having a gap therein at a station, at least one vertically movable auxiliary carrier located at each station, supporting rail means mounted on said auxiliary carrier and adapted to bridge the gap in said rail and support said workpiece carrier when the carrier is moved into the station, linearly reciprocable actuating means common to and extending between said plurality of stations, means connecting the actuating means to said auxiliary carriers, and drive means for moving the actuating means in both directions, whereby a movement of the actuating means causes a corresponding vertical movement of the workpiece carrier, said connecting means comprising a vertically movable cam member operatively connected with said actuating means, a bell-crank pivotally mounted about a horizontal axis at the apex of its angle on a fixed portion of said transfer machine, a cam follower mounted on one arm of said bell-crank and riding on the surface of said cam member, the other arm of said bell-crank being pivotally connected to said auxiliary carrier and a spring connected to said auxiliary carrier and tending to retain said auxiliary carrier in the position where said supporting rail means bridges the gap in said rail.

References Cited in the file of this patent
UNITED STATES PATENTS

| | | |
|---|---|---|
| 2,685,954 | Curtis | Aug. 10, 1954 |
| 2,709,512 | Curtis | May 31, 1955 |
| 2,716,415 | Davis | Aug. 30, 1955 |